(12) United States Patent
Di Lodovico et al.

(10) Patent No.: US 7,639,651 B2
(45) Date of Patent: Dec. 29, 2009

(54) DISTRIBUTED MEDIUM ACCESS CONTROL FOR BROADBAND ACCESS SYSTEMS

(75) Inventors: Hakim Di Lodovico, Rome (IT);
Massimiliano Buscato, Motta Visconti (IT); Marco Fioretti, Rome (IT);
Marzio Puleri, Fiano Romano (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 459 days.

(21) Appl. No.: 10/596,403

(22) PCT Filed: Dec. 15, 2003

(86) PCT No.: PCT/EP03/14243
§ 371 (c)(1),
(2), (4) Date: Jun. 12, 2006

(87) PCT Pub. No.: WO2005/060174
PCT Pub. Date: Jun. 30, 2005

(65) Prior Publication Data
US 2007/0116029 A1    May 24, 2007

(51) Int. Cl.
*H04J 3/00* (2006.01)
(52) U.S. Cl. .................................... 370/337; 370/280
(58) Field of Classification Search ............... 370/337, 370/280, 442
See application file for complete search history.

(56) References Cited

U.S. PATENT DOCUMENTS 6,016,311 A * 1/2000 Gilbert et al. ............... 370/280

(Continued)

FOREIGN PATENT DOCUMENTS

EP    1 215 931 A1    6/2002

(Continued)

OTHER PUBLICATIONS

PCT International Search Report, dated Oct. 26, 2004, in connection with International Application No. PCT/EP03/14243.

(Continued)

*Primary Examiner*—Albert T Chou
(74) *Attorney, Agent, or Firm*—Potomac Patent Group PLLC (57) ABSTRACT

A distributed scheduler for frame based communication between a plurality of terminals and a master controller, comprises a plurality of concentration elements for local scheduling of upstream data, the plurality of concentration elements and the plurality of terminals being partitioned over a plurality of cells distributed on a multiple hierarchical level star topology, each cell belonging to a hierarchical level N, where N is comprised between a top level, corresponding to a single cell to which the master controller is assigned, and a bottom level; at each cell at level N one concentration element being the master element for the cell and the remaining concentration elements and terminals in the cell being slave elements of the master element for the cell; each master element in a cell at level N being in turn a slave of the master element in one of the cells at level N+1, the master element at the top level being the master controller; each master element at level N comprising means for collecting uplink aggregate requests and flows originating from the slave elements thereof and means for generating an aggregate flow and aggregate uplink requests, which are input to the master element at level N+1 to which the master element at level N is slave.

10 Claims, 7 Drawing Sheets

U.S. PATENT DOCUMENTS 6,785,252 B1 * 8/2004 Zimmerman et al. ........ 370/337

FOREIGN PATENT DOCUMENTS

| WO | WO 02/05453 A2 | 1/2002 |
| WO | WO 02/15520 A1 | 2/2002 |

OTHER PUBLICATIONS

PCT Second Written Opinion, dated Oct. 2, 2005, in connection with International Application No. PCT/EP03/14243.

PCT International Preliminary Examination Report, dated Mar. 13, 2006, in connection with International Application No. PCT/EP03/14243.

* cited by examiner

DISTRIBUTED MEDIUM ACCESS CONTROL FOR BROADBAND ACCESS SYSTEMS

FIELD OF THE INVENTION

The present invention relates to point-to-multipoint (PMP) access networks and, in particular, to a distributed method and system for Medium Access Control (MAC) on a physical channel shared by several terminals and controlled by a master controller.

BACKGROUND OF THE INVENTION

In recent years, the fast growing of datacom networks and the large and ever-increasing amount of services made available to the users over such networks have led to a remarkable growth of traffic which is heavily affecting network performance.

The terrestrial broadband wireless access (BWA), point-to-multipoint (PMP) systems with dynamic capacity allocation are thus expected to support and provide an increasing number of applications and services, including highly demanding multimedia services, for instance fast Internet video and video on demand (VoD), and last generation mobile network infrastructure, including the 2G/3G mobile network infrastructure, particularly as concerns connection among mobile base stations and switch sites.

In a typical system, a PMP system topology scheme comprises a plurality of base stations connecting several access terminals through particular media and by using particular multiple access schemes.

In order to cope with these ever increasing needs, a broadband access network needs to make the most efficient possible use of shared resources, both to save bandwidth and to differentiate services. As a consequence, bandwidth shall be allocated only on demand, automatically and without human intervention, and it shall be possible, at the same time, to serve each one of different flows according to traffic contracts and real time characteristics.

In order to fulfil these requirements, a Medium Access Control (MAC) controller or scheduler must continuously monitor all the traffic streams entering the channel and grant access to each stream according to its privileges. In general, these privileges are specified through a set of Quality of Service (QoS) parameters which may vary in accordance with transport network involved, e.g. ATM, IP and so on.

With regard to downstream traffic, which conventionally identifies data flowing from the backbone network to the Customer Premises Equipment (CPE), both the sources and the scheduler are at the same end of the channel. The scheduler is therefore fully aware of the traffic situation and has the necessary information to properly manage bandwidth allocation. In fact, the scheduler or controller knows instant by instant the status of all of queues it is managing and selects the next queue to be served according to well known state of the art techniques.

On the contrary, when upstream traffic is concerned, which conventionally identifies data flowing from a CPE to the backbone network, the scheduler and the sources are physically located at opposite ends of a channel. A control information exchange is therefore required, in that the state of each CPE queue is unknown to the scheduler or controller and must be somehow communicated, at least partially, for proper communications scheduling.

In BWA/PMP systems, as in most communication networks, information is transferred in frames. A frame is a block of data containing both actual data and ancillary information to synchronise transmission and to supply transmission data.

In the state of the art, different ways are known and employed to remotely multiplex accesses over a TDMA channel, satisfying both traffic contracts and real time requirements.

The most basic technique is to avoid any communications channel between the central scheduler and the CPE. In this case, the upstream channel is statically partitioned among all of the active user terminals, which are set up at configuration time. This technique does not waste any extra bandwidth but, as a major drawback, does not allow any statistical multiplexing. Moreover, in order to add one connection to the network, the operator may be forced to set up again all the other terminals that share the same channel, even though their needs have not changed.

Another widely used method is to store multiplexing information inside the central scheduler, which is then in charge of sending upstream transmission permits, one at a time, to the authorised terminals. No need arises to reprogram the terminals and the bandwidth allocation can be manually changed quite easily. However, the resulting system is once again of a static nature, so that when a terminal is temporarily in a situation with no pending data to send upstream, its assigned frame slots cannot be redistributed to other terminals and, therefore, are completely wasted.

Ideally, terminals should be polled on a periodical basis and upstream transmission permits should be sent only to those terminals whose queues are not empty. The main issue in this case is that, in order for the scheduler to have a reasonable information about all pending queues, far too much bandwidth must be reserved in the upstream channel, easily leading to a degradation of the service.

Instead, the signalling bandwidth, that is the bandwidth which is allocated to the transfer of ancillary data providing terminal status information to the scheduler, shall be minimised. In this respect, the most common solutions for reporting requests to the base station, where the scheduler is located, are contention, piggybacking and polling.

Contention slots are portions of the uplink frame that are dedicated to the terminal requests without specifying which terminal has the right to use it. It is so possible for more terminals to try and access the same slot at the same time, causing collision, the main drawback of contention based methods, which causes poor reliability and sets no upper limit for latency.

Piggybacking is performed when the requests are not issued in a given portion of the frame but in a given portion of the MAC data unit, so that the updating rate of the information depends on the terminal activity. This method usually reduces the average latency but is still unable to guarantee that an upper limit is not exceeded. For this reason, it is always coupled with at least one more method, so as to give the terminal a chance to send requests again after the previous period of activity has lapsed. As a rule, when the traffic is bursty the efficiency of piggybacking methods actually depends on the efficiency of the other associated method.

Polling means that the base station, i.e. the scheduler running thereon, assigns some bandwidth to the terminals for issuing their requests. This is done either on a periodical basis through dedication of a given portion of an uplink frame, in which each terminal is assigned to a specific slot. The delay variation introduced on the uplink traffic depends on the polling period but is usually quite limited.

Although all of the above methods may be equally employed, real time systems, in which it must be ensured that a base station receive requests from the terminals in a smaller period than the given real time delay constraints, are usually implemented through polling mechanisms. The main drawback of polling is given by its static nature. In fact, the delay constraints set a limit for the polling period: the stricter the real time requirements, the more often resources have to be dedicated to request fields. These resources remain statically allocated and are therefore not available for data traffic. As consequence thereof, a static signalling channel must be created and dimensioned to fulfil the delay requirements in the worst traffic conditions, thus heavily affecting the available bandwidth even under low data traffic conditions. Moreover, if either the amount of terminals in the system or the service classes which need to send information to the base station increase over time, the portion of bandwidth that is made unavailable to data traffic grows in parallel, affecting the efficiency and the performance of the system.

SUMMARY OF THE INVENTION

Aim of the present invention is to overcome the above mentioned problems, by providing a method of minimising bandwidth consumption for signalling, with particular reference to point-to-multipoint broadband networks.

Within this aim, object of the present invention is to support different dynamic scheduling policies and multiple service categories and to provide for a scheduling system which is scalable to many levels of hierarchy.

An other object of the present invention is to efficiently track, in real time, the actual needs of each terminal so as to grant bandwidth only in case that there is data to be sent, redistributing the available bandwidth if the terminal has no data to send.

A further object of the invention is to propagate backpressure spontaneously to the lowest level, without further explicit commands.

Yet another object of the present invention is to improve polling mechanisms as known in the state of the art.

This aim, this object and others, which will become apparent hereinafter, are achieved by a method of scheduling upstream data for frame based communication between a plurality of terminals 20 and a master controller 10, the method comprising the steps of providing a plurality of concentration elements for local scheduling of upstream data; partitioning the plurality of concentration elements and the plurality of terminals over a plurality of cells distributed on a multiple hierarchical level star topology, each cell belonging to a hierarchical level N, where N is comprised between a top level, corresponding to a single cell to which the master controller is assigned, and a bottom level; in each cell at level N, selecting one concentration element to be the master element for the cell and selecting the remaining elements and terminals in the cell to be slave elements of the master element for the cell; each master element in a cell at level N being in turn a slave of the master element in one of the cells at level N+1, the master element at the top level being the master controller; defining at least one flow service category; at each master element at level N, collecting uplink aggregate requests and flows originating from the slave elements thereof and, for each service category, aggregating flows into one aggregated flow generating new uplink requests for each flow, which are input to the master element at level N+1 to which the master element at level N is slave.

At each master element, bandwidth is allocated to each connected slave according to the aggregate requests and to the available bandwidth.

This aim and these objects are also achieved by a distributed scheduler for frame based communication between a plurality of terminals and a master controller, comprising a plurality of concentration elements for local scheduling of upstream data, the plurality of concentration elements and the plurality of terminals being partitioned over a plurality of cells distributed on a multiple hierarchical level star topology, each cell belonging to a hierarchical level N, where N is comprised between a top level, corresponding to a single cell to which the master controller is assigned, and a bottom level; at each cell at level N, one concentration element being the master element for the cell and the remaining concentration elements and terminals in the cell being slave elements of the master element for the cell; each master element in a cell at level N being in turn a slave of the master element in one of the cells at level N+1, the master element at the top level being the master controller; each master element at level N comprising means for collecting uplink aggregate requests and flows originating from the slave elements thereof and means for generating an aggregate flow and aggregate uplink requests, which are input to the master element at level N+1 to which the master element at level N is slave.

Advantageously, the invention is based on a polling mechanism, and aggregate requests are recalculated at each polling period or multiples thereof.

When more categories or classes of services are involved, each slave element is preferably provided with a flow selector which aggregates flows according to the flow categories and, at each permit, selects and sends one data unit of one of the aggregate flows to the corresponding master element.

A first portion of the upstream frame may be used for the storing of bandwidth request information, the size of the first portion of the frame being sufficient to address all the slots in the frame. Alternatively, a first portion of the frame is reserved for the storing of bandwidth request information, the size of the first portion of the frame is sufficient to address RTT+ $(N_{RG}-1)$ slots in the frame, wherein RTT is the Round Trip Time and $N_{RG}$ is the number of different request groups in a terminal, and the remaining request information is piggybacked on traffic slots in the upstream frame.

When the bandwidth request information comprises guaranteed bandwidth requirements and excess bandwidth requirements, each master element integrates the requests of granted bandwidth over a time window of length IT, where IT is an integer multiple of the polling time period, so as to dynamically adjust the guaranteed quote for each slave element.

BRIEF DESCRIPTION OF THE DRAWINGS

Further characteristics and advantages of the present invention will become apparent from the following detailed description, given by way of a non limitative example and illustrated in the accompanying figures, wherein.

DETAILED DESCRIPTION OF THE INVENTION

Figure 1:
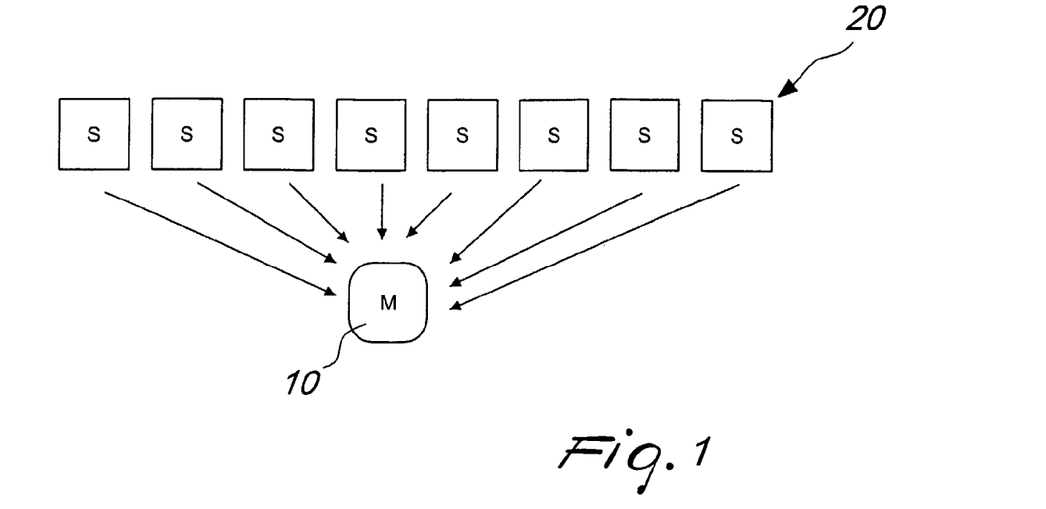
FIG. 1 is a schematic view showing a master base station and a plurality of slave terminals according to the prior art.

FIG. 1 is a schematic view showing a traditional communications network according to the prior art, comprising a base node station 10 and a plurality of access terminals 20.

A controller and scheduler runs on the master node station and acts as a master element for the access terminals 20, which are slaves in the system. The communication from the master node 10 to the slave terminals 20 is conventionally referred to as "downlink" or "downstream" communication, while the communication from a slave terminal 20 to the node station 10 is referred to as "uplink" or "upstream" communications. The communications flows are typically divided in time frames.

The node station is provided with conventional hardware and/or software computation means for handling communication from and to the terminals 20 on one side and from and to the communications network on the other side. More particularly, such computation means are programmed through conventional techniques according to the MAC scheduling algorithms disclosed by the present invention.

Figure 2:
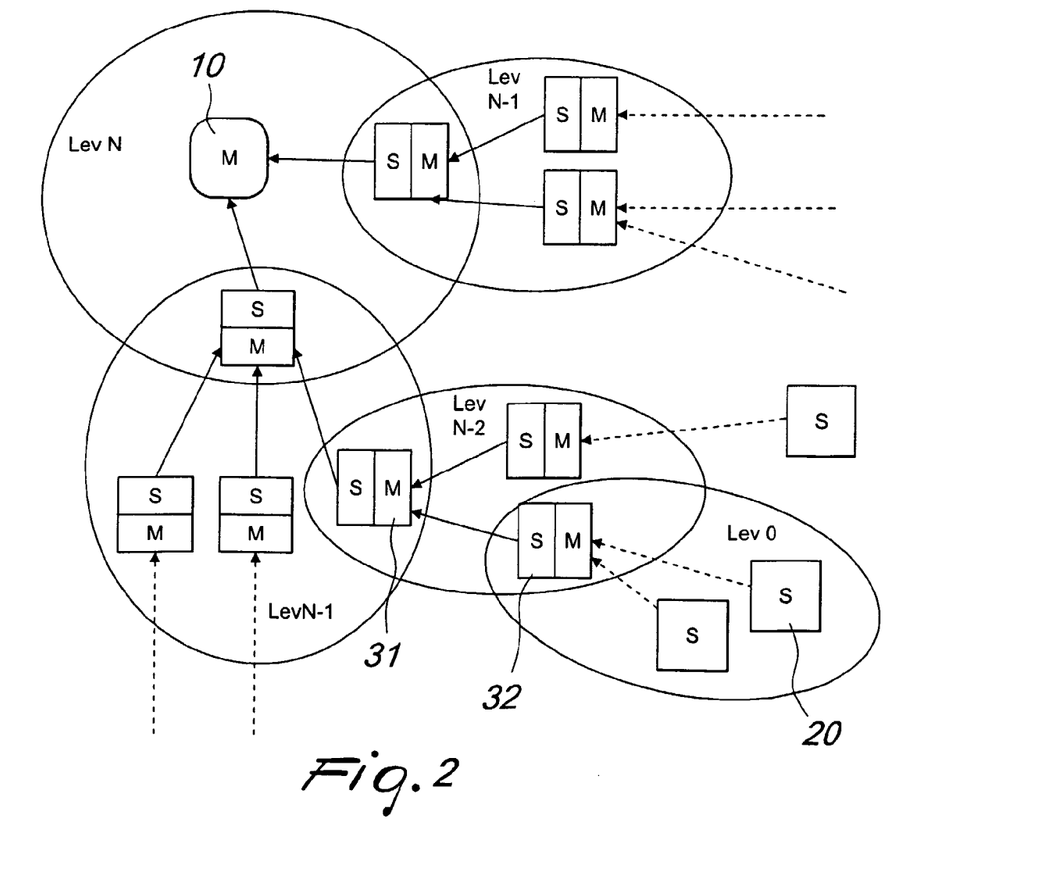
FIG. 2 is a block diagram showing a hierarchical network topology according to the present invention.

FIG. 2 is a block diagram which shows a multiple level star topology implementing a distributed scheduling architecture according to the present invention.

Levels in the hierarchy range from 0 to N, where 0 identifies the bottom level and N identifies the top level.

Each one of levels 1 to N comprises a plurality of cells, each of which comprises in turn a plurality of elements, hereby referred to as concentration elements.

Within each cell, one of the concentration elements is selected to be the master element for the cell, the remaining elements being slave elements to the master element. Each master element in a cell at level I is set to be in turn a slave element to the master element belonging to a cell at level I+1.

Each one of the terminals 20 is assigned to a cell at any of level 0 to N. In principle, the terminals are assigned to a cell at the bottom level 0, but may also be assigned to a different cell at a higher level.

As a result, at every level of the hierarchy, each cell comprises several concentration elements, one of which is the master element for all of remaining elements in the cells, which can be further concentration elements 30 or terminals 20. The master element at level N is not slave to any other element.

The operation of the system is as follows.

Each master element in a cell at level I communicates bidirectionally with all its slave elements in the cell and with its own master in a corresponding cell at level I+1.

More in detail, each master element collects uplink traffic and uplink requests from its slaves and generates uplink traffic and uplink request to its corresponding master at a higher level.

The uplink traffic and requests are generated by the terminals 20. Each uplink request is then transmitted to the master concentration element 30 to which at least some of the terminals have been assigned. The concentration element 32 gathers the flows originating from its connected terminals and generates an aggregate flow, which includes an aggregate request, which, in the simplest case, is the sum of all of the single requests received from the terminals 20.

The flow is fed to a concentration element 31 in a cell at a higher level to which the master concentration element 31 is slave.

The concentration element 31 gathers in turn all the flows originating from its connected slave concentration elements 32 and/or terminals 20 and generates a corresponding aggregate flow including an aggregate request.

The process continues through all the levels of star topology until the cell at top level N and the master controller 10 is reached.

In a preferred embodiment of the invention, the master controller 10 performs its conventional activity, according to any chosen scheduling algorithm, and allocates bandwidth according to the information transferred thereto by its slave elements. The scheduling decision or bandwidth allocation is thus taken on the basis of aggregate information and is notified to its slave elements. If a slave element is a concentration element, then a similar scheduling operation is carried out on the basis of the available bandwidth as communicated by the master controller 10 and according to the same or any other suitable scheduling algorithm.

The process is iterated through all the levels and the cells in the distributed scheduling architecture until the bottom level is reached and all the terminals 20 have been served.

Clearly, downlink traffic is obviously allowed through the concentration elements. However, since it is not relevant to the inventive concept underlying the present invention, downlink traffic will be disregarded in the present description.

The skilled in art appreciates that the cells according to the invention, even at the same level, may have rather different physical structures. For instance, the master element and the slave elements of a cell may be whole racks geographically spread over a MAN/WAN area, while the master and slave elements of another cell may be just different boards, or even parts of them, inside one single CPE terminal.

At every level of the hierarchy, each flow originating from a slave element and competing for bandwidth inside a cell is an aggregate flow, generated by the slave element acting as a master for a corresponding cell at level I-1, of the flows originating inside or converging to the slave elements from the cells of which it is master.

The master element of a cell is only aware of the parameters and characteristics of the aggregate flow and allocates bandwidth according to the received aggregate requests, irrespective of how the aggregate flow and uplink requests have been generated by a slave element or of bandwidth distribution among the flows in the slaves. In fact, each slave element of a master at level I will be allocated a certain amount of bandwidth by its master in the same cell and will redistribute it to its slave in the cell at level I-1 for which it is master.

Allocating bandwidth, on the basis of aggregate information only, allows to minimise the signalling bandwidth required to transfer the upstream requests needed for serving the terminals 20 as a whole.

The aggregate flow generated by each concentration element can be static or dynamic, composed of different sub-flows at any polling period. Particularly, the aggregate flow sent upstream by a concentration element may be handled by a flow selector, which takes into account, for the calculation and the upstream sending of traffic parameters, only queues that are not empty.

Figure 3:
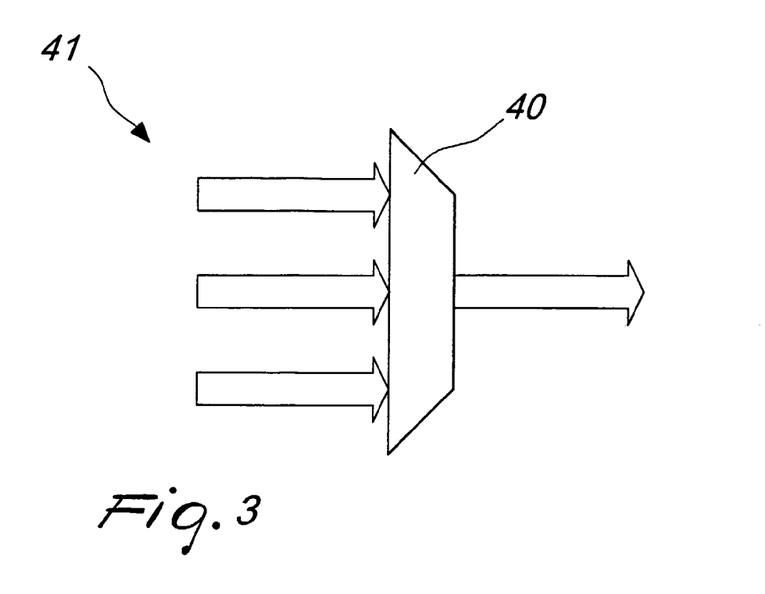
FIG. 3 is a block diagram showing a basic flow selector.

In a preferred embodiment, each concentration element comprises one or more flow selectors 40, as will become clear from later on. Picture 3 shows a basic flow selector, which is a device based on hardware, software or both which is in charge to select one of the inputs 41 and to forward it upstream.

Particularly, the aggregate flow parameters which vary in real time with the current status of the queues of each flow are preferably calculated at least once per polling period by the slave and only the result is transmitted upstream to the master element as a request coming from one single traffic source.

As soon as the master element has collected all the status information from all of its slave elements, a flow selector in the master element finds out which slaves have data units waiting for transmission and, for the current polling period, ignores all others.

For each transmission interval within the current polling period, the flow selector decides which element is given permission to use it. To this purpose, the flow selector may use any criterion, including simple round robin techniques to any sophisticated bandwidth sharing algorithm.

The most critical requirement is that the flow selector is implemented so as to take into account, at least at each polling period, the status of each of the queues at its input and, particularly, an empty or not-empty status, in order to temporarily disregard those flows which are currently idle.

This is of fundamental importance for avoiding waste of bandwidth, since the competition becomes limited only to those flows that do need bandwidth at the current polling period.

Clearly, a plurality of parameters may be used to weight and evaluate the requirements of each flow and be exploited by the flow selector in order to take a decision on which flow shall be served next. Such parameters may be constant and statically provisioned at the time the flow is set up, or may vary in accordance to the time of the day, for instance to allow different scheduling policies in office hours night hours and so on, or vary once every T polling periods, for instance to integrate bandwidth calculations and to compensate for occasional rounding errors that may occur on narrow time windows.

The flow selector 40 works preferably on traffic flows featuring same or similar characteristics, i.e. completely defined by a same common set of parameters. This means that the prior of each flow in respect of the others and the selection of a flow by the flow selector depend only on the values of the parameters themselves.

However, the distributed scheduling system according to the present invention is capable to handle different categories or classes of flows at the same time, which categories can thus coexist at the same level of the scheduling hierarchy.

Figure 4:
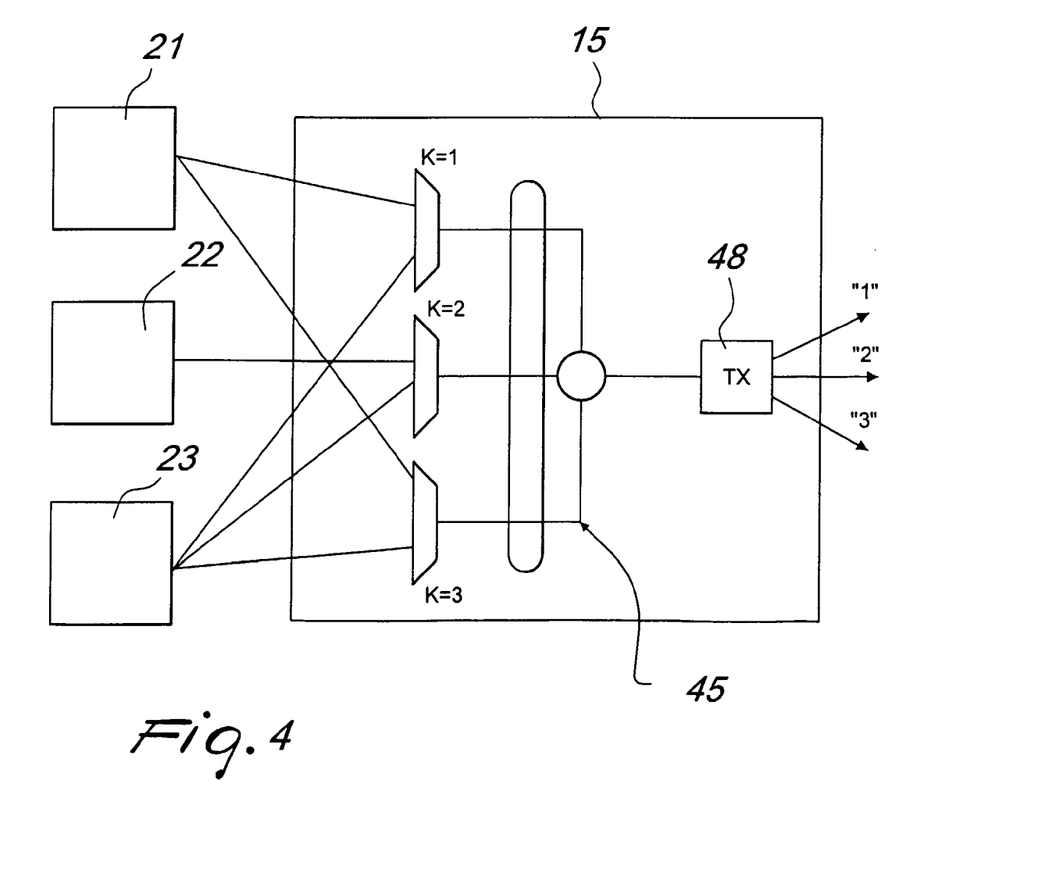
FIG. 4 is a block diagram showing a scheduling architecture according to the present invention involving parallel flow selectors.

In this case, as it is schematically shown in FIG. 4, a separate flow selector is instantiated for each category to be served along a certain path in the system, leading from a terminal 20 to the master controller 10.

Separate schedulers are used on each concentration element and on the master controller to handle the different categories of data flows.

More in detail, each one of the slave elements that originates flows in different categories feeds its output flows to the flow selector in its master element corresponding to the output category.

FIG. 4 illustratively shows a cell comprising a master element 15 and three slave elements 21-23, which may be either terminals 20 or concentration elements 30. The slave elements generate flows belonging to different categories k: slave element 21 generates two flows belonging to categories k=1 and k=3, slave element 22 generates only one flow belonging to category k=2, slave element 23 generates three flows belonging to categories k=1, k=2, and k=3.

The request of service by each slave element for each flow is transmitted to the master element 15 and is fed, according to the category to which it belongs, to one of three different flow selectors which are in charge of selecting a flow to be served in the corresponding category. A further flow selector 45, or alternate controlling means, evaluates which flow is to be served next. Each data unit received from the slave element is buffered in a corresponding per flow queue in the master element 15. The requests of service for each aggregate flow of the master element 15 are then forwarded, via a transmitter 48, to a corresponding flow selector in the concentration element or master controller to which it is slave.

Figure 5:
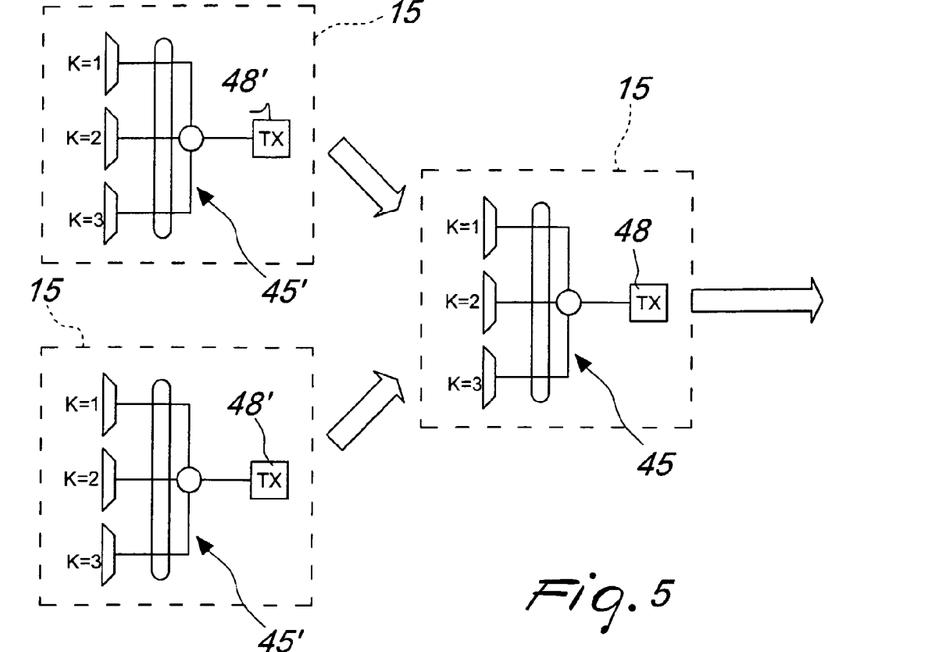
FIG. 5 is a block diagram further detailing a multi-level aggregate scheduling architecture according to the present invention.

As schematically illustrated in FIG. 5, the architecture described in FIG. 4 can be cascaded even within a same cell, so that the scheduling decision is distributed both in time and space. More in detail, the decision of which flow will be granted the next upstream transmission time is taken both in the master element, which selects the slave element to be served and by the slave element itself, which, when it is reached by the decision from the master element, selected a flow, among the plurality of its local slave, that will benefit of the master's decision.

Figure 6:
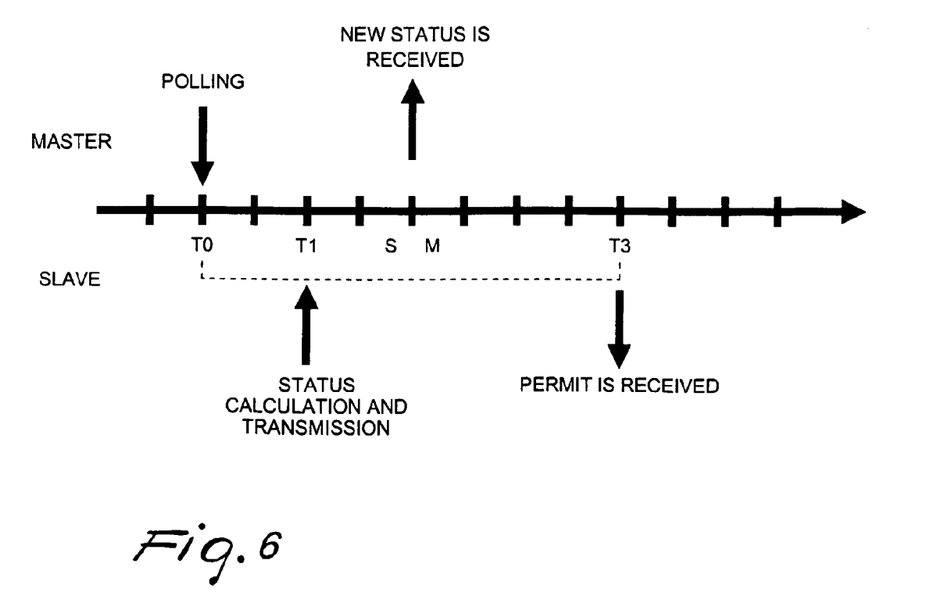
FIG. 6 is a diagram showing master-slave communication logics in the time domain according to the present invention.

FIG. 6 show the basic distributed scheduling process in the time domain as used in the preferred embodiment according to the present invention.

Particularly, a polling command is issued by a master element at time $T_0$ and is received by its slave elements after a certain delay at time $T_1$. When the polling command is received, the slave checks its slave flows to identify the non-empty ones and, optionally, stores this information up to the next polling command. The slave element then calculates all the parameters of the aggregate flow composed of the flows which are active at that moment and sends the aggregate information to the master, which receives it at time $T_2$. If the master's flow selector, later in the polling period, decides that the current parameters of the slave's aggregate flow entitle to a permit, the permit is transmitted downstream to the slave. As soon as the slave element receives it at time $T_3$, the scheduling process is repeated by its local flow selector.

The latter actually may take a decision by choosing the beneficiary flow among the queues which were not empty when the status calculation was performed and transmitted to the master or among the queues which are not empty when the permit is received, for instance to take into account high priority flows, as will be better explained hereafter.

Therefore, according to the distributed scheduling method hereby disclosed, each concentration element handles aggregates of flows without awareness of single element flows. This reduces the amount of signalling bandwidth to be allocated over a physical channel.

Figure 7:
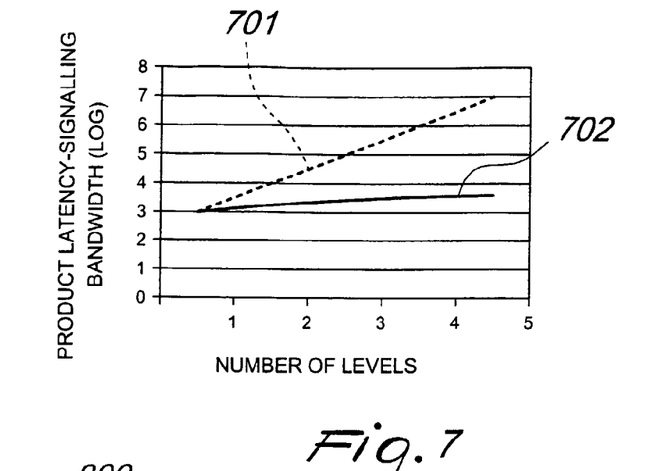
FIG. 7 is a diagram comparing product latency-signalling bandwidth performances obtained by the scheduling method according to the present invention and the traditional method according to the prior art.

To this regard, FIG. 7 is a diagram comparing latency—signalling bandwidth performances obtained by the scheduling method according to the present invention and the conventional method according to the prior art.

In a prior art configuration as shown in FIG. 1, the product "latency-signalling bandwidth" value in real time traffic scheduling is proportional to the number of traffic sources.

In the following expressions, t is the permit generation latency, T is the packet latency time, SB is the signalling bandwidth, Z is the request size, whose maximum value corresponds to the frame size, and Y is the number of traffic sources. For the sake of simplicity, the number of slave elements per hierarchy level is assumed constant and equal to X, so that if n is the number of levels in the hierarchy, then the overall number of traffic sources is $X^n$. Supposing that a same polling period is used both in the prior art and in a system according to the present invention, the average latency time can be assumed to be the same.

In order to compare the prior art to the present invention, it is assumed that the same number of traffic sources is present both in a prior art system as shown in FIG. 1 and in a system according to the present invention. Therefore, it is assumed that $Y=X^n$.

In the prior art system shown in FIG. 1, t=1, T=t and $Y=X^n$, so that $T*SB=X^n*Z$.

In a system according to the present invention, t=1, T=n*t=n, so that $T*SB=n*X*Z$.

FIG. 7 shows how a system according to present invention clearly outperforms the prior art. In the diagram, line 701 refers to the T*SB product according to the prior art, line 702 refers to the same latency-signalling bandwidth when the present invention is applied. The results shown in FIG. 7 refer to the case of X=10 and Z=80.

Figure 8A:
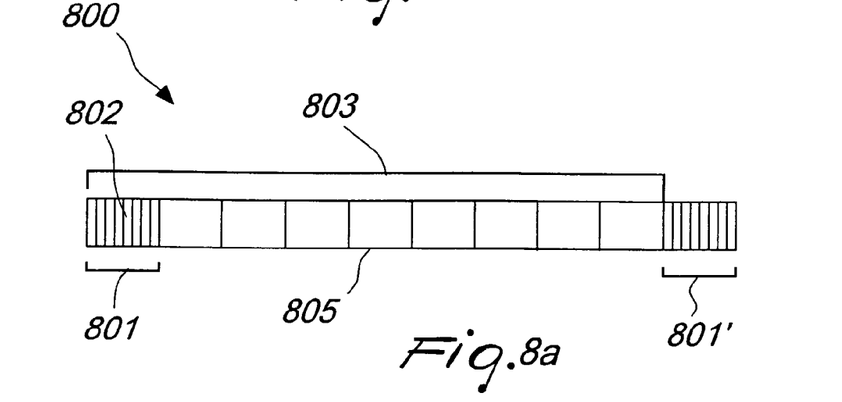
FIG. 8a is a block diagram showing request information allocated in a frame according to the prior art.

In order to further advance the performance of the distributed scheduling method and system above described, a novel polling method is applied. It is known that, in a point to multipoint system featuring a slotted MAC frame and based on polling, a portion of the uplink bandwidth, corresponding to a certain number of slots, is reserved for carrying uplink requests from the terminals to scheduler and controller, usually at the beginning of the frame. A polling frame is in fact defined as the total number of slots between the beginning of two consecutive request areas. The polling period is the duration or size of the frame expressed as the number of time slots stored therein. The choice of the polling period depends on the maximum delay allowed for the uplink traffic. In order to avoid collision between requests coming from different terminals, each terminal is assigned a dedicated area, be it a slot or a portion of a slot, to specifically insert its requests. FIG. 8a depicts a conventional uplink frame 800 structure in which a request area 801 comprising request fields 802 is reserved at the beginning of the frame. The polling period 803 is thus defined by the number of slots 805 between the beginning of request area 801 belonging to frame F and the beginning of request area 801' belonging to frame F+1.

The amount of information carried by the request fields is usually related to the amount of data which is queued in each terminal replicated for each request group. The information must be sufficient to allow the terminal to use the data traffic slots 805 in the whole polling period. Therefore, the polling period determines the length of the request fields, while terminals and request groups determine the amount of required request fields.

As a consequence, the percentage of bandwidth that is not available for traffic data when a pure polling frame is used can be expressed as:

$$Bp=[N_{AT}/\lfloor (SL*8)/(OH+N_{RG}*\lceil \log_2 PP \rceil) \rfloor]*100/PP,$$

where $N_{AT}$ is the number of terminals, $N_{RG}$ is the number of request groups, PP is the number of time slots in the polling period, SL is the size of the time slot expressed in bytes and OH is the overhead related to each slot.

The amount of bandwidth calculated according to the above expression, which represents the wasted bandwidth when a pure polling mechanism is adopted, will be hereby taken into account in order to evaluate the performance of a new polling method according to a second aspect of the present invention.

In fact, in order to further enhance the performance of the distributed scheduling method and system according to the present invention, an improved polling mechanism, hereby referred to as "distributed polling" is now described with reference to FIG. 8b.

Figure 8B:
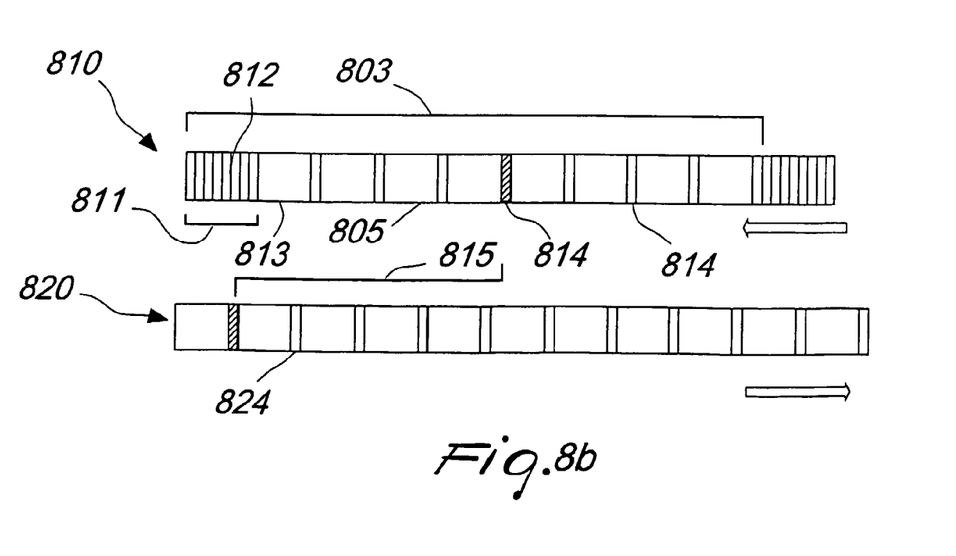
FIG. 8b is a block diagram showing request information allocated in a frame by an interleaved distributed polling according to the present invention.

FIG. 8b shows a downlink frame 820 comprising a plurality of slots, which contain portions 824 indicative of respective uplink grants.

FIG. 8b also shows an uplink frame 810 comprising a request area 811 comprising request fields 812 and traffic data slots 813. In each traffic data slot 813, a portion 814 is dedicated to the carrying of request fields. Therefore, part of the requests is stored in a first area 811 of the frame, while the updates of the requests are piggybacked on the actual data slots. The portion 811 dedicated to request fields only is thus considerably reduced with respect to a pure polling mechanism, in that it is dimensioned so as to cover only the number of slots corresponding to the Round Trip Time (RTT) 815, which is the time interval between the sending of a grant and the reception of a slot at the destination node, as shown in FIG. 8b, and must no more cover the entire polling frame.

Upon receiving of the request portion of a frame, the scheduler begins to schedule grants. In the worst case, all the grants will be assigned to the same terminal. Since the first traffic slot carrying a piggyback field updating the pending requests is received only RTT slots later, the request fields can be shortened to cover only $\log_2$ RTT slots.

The above described distributed polling mechanism is applicable also in the case that more than one service class or category is present in a terminal. In this case, the size of the request fields must be at least $\lceil \log_2 (RTT+N_{RG}-1) \rceil$ bits.

The portion of the polling period frame dedicated to the requests contains a request field for each terminal and each request group that shall be serviced through the distributed polling mechanism, while each uplink data time slot carries only one request field, filled with information related to one request group only. The sequence of the requests related to each group must be known at both sides of the communication channel, so that the information is rotated and the master node receives a full update every $N_{RG}$ slots from the same terminal.

The master node thus receives knowledge of pending requests at the beginning of the frame, which knowledge is sufficient to cover at least the following $RTT+N_{RG}-1$ slots. This information is then dynamically updated during the polling period through information carried in the frame. The information is interleaved among slots coming from different terminals and different request groups from a same terminal.

The percentage of bandwidth which is not available for data in case of distributed interleaved polling is calculated through the following expression, which indicates the number of slots required in the uplink polling section:

$$\text{req\_slots} = \left\lceil \frac{N_{AT}}{\left\lfloor \frac{SL \cdot 8}{(OH + N_{RG} \cdot \lceil \log_2(RTT + N_{RG} - 1) \rceil)} \right\rfloor} \right\rceil$$

the required bandwidth in the case of interleaved polling being $$BD_{IP} = (\text{req\_slots} * SL * 8 + (PP - \text{req\_slots}) * \lceil \log_2(RTT + N_{RG} - 1) \rceil) * 100/(PP * SL * 8).$$

Figure 9:
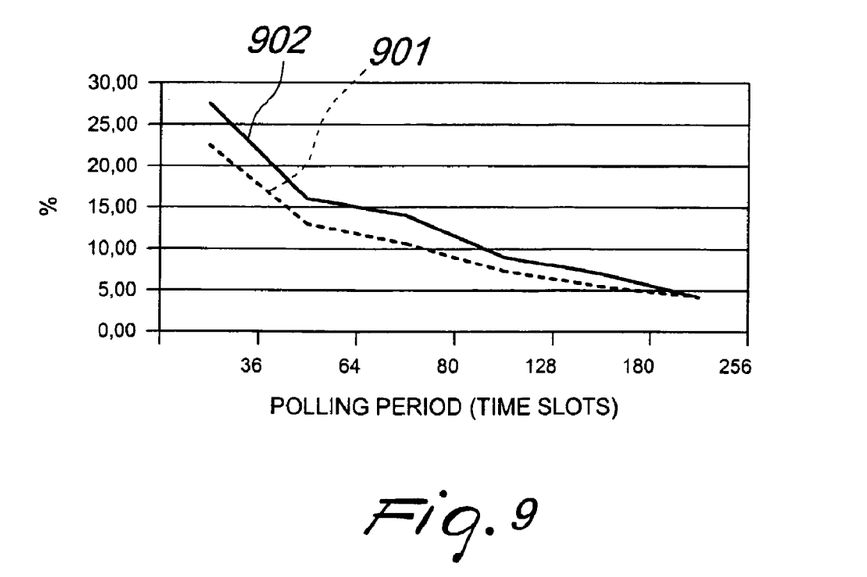
FIGS. 9 and 10 are diagrams comparing the percentage of consumed bandwidth applying interleaved distributed polling according to the present invention against pure polling in a distributed scheduling system.
Figure 10:
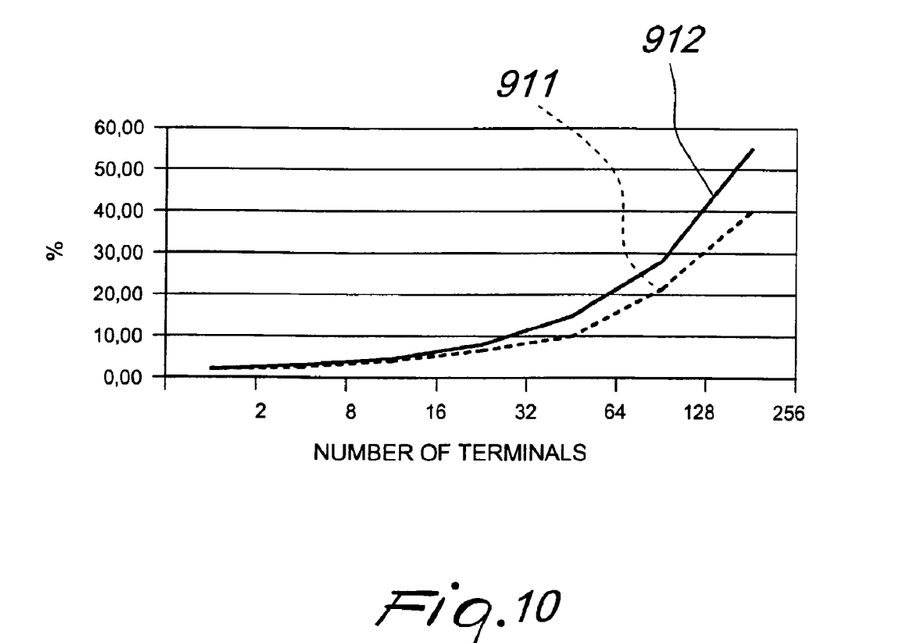

The first expression shows that the polling period PP is no longer a member in the computation, which makes the disclosed distributed interleaved polling mechanism much more efficient than the pure polling mechanism according to the prior art, as it shown in the diagrams of FIGS. 9 and 10 and by the following tables 1 and 2. The slot size is assumed to be an ATM cell.

Table 1 and FIG. 9 identify the percentage of bandwidth taken up by uplink requests when a distributed polling mechanism according to the present invention is adopted, as shown by line 901, versus a pure polling mechanism, shown by line 902. The number of terminals ($N_{AT}$) is fixed to 64.

TABLE 1

| | | % of consumed bandwidth | | | |
|---|---|---|---|---|---|
| $N_{AT}$ | PP | Pure Polling | I.D.P. | Delta | Gain |
| 64 | 36 | 27.78 | 22.87 | 4.91 | 17.67 |
| 64 | 64 | 15.63 | 13.23 | 2.40 | 15.33 |
| 64 | 80 | 13.75 | 10.75 | 3.00 | 21.82 |
| 64 | 128 | 8.59 | 7.03 | 1.56 | 18.18 |
| 64 | 180 | 6.11 | 5.24 | 0.87 | 14.24 |
| 64 | 256 | 4.30 | 3.93 | 0.36 | 8.48 |

The data quoted in Table 1 has been computed assuming RTT=10 and $N_{RG}$=3. FIG. 9 shows a significant advantage for reasonably low values of the polling period (PP), as it usually needed by delay sensitive applications.

Table 2 and FIG. 10 show the percentage of bandwidth taken up by uplink requests when a distributed polling mechanism according to the present invention, shown by line 911, is adopted versus a pure polling mechanism, shown by line 912. Again, all computations assume RTT=10 and $N_{RG}$=3, while the polling period (PP) is set to 80 slots per frame.

TABLE 2

| | | % of consumed bandwidth | | | |
|---|---|---|---|---|---|
| $N_{AT}$ | PP | Pure Polling | I.D.P. | Delta | Gain |
| 2 | 80 | 1.25 | 2.07 | −0.82 | 65.83 |
| 8 | 80 | 2.50 | 2.07 | 0.43 | 17.08 |
| 16 | 80 | 3.75 | 3.31 | 0.44 | 11.67 |
| 32 | 80 | 7.50 | 5.79 | 1.71 | 22.78 |
| 64 | 80 | 13.75 | 10.75 | 3.00 | 21.82 |
| 128 | 80 | 27.50 | 20.67 | 6.83 | 24.85 |
| 256 | 80 | 53.75 | 40.50 | 13.25 | 24.65 |

The above data shows that the distributed polling mechanism according to the present invention allows an efficient usage of the bandwidth ensuring a reliable delay control in case of strict delay constraints, which is the main characteristic of polling. FIG. 10 shows at a glance that bandwidth saving increases rapidly as the number of terminals grows.

The skilled in the art will appreciate that the dimensioning of the request fields is always proper, saving bandwidth. The polling period can vary according to real time requirements, only the RTT is required to remain constant for a correct alignment of the terminals. The invention does not increase the computation effort all over the system, since it requires only the insertion of the current queue status by the terminals in a proper field of each slot and the overwriting of the current status of the request in the base station, without impacting the scheduling mechanism. Moreover, the same amount of bandwidth dedicated to the polling mechanism allows increasing the number of traffic categories or of terminals in the system.

It has been shown that if a distributed MAC functionality is adopted, the requests of the terminals are transmitted as aggregates per traffic category, minimising the signalling information and reducing latencies. Being the MAC distributed, the base station handles only the bandwidth allocation among the terminals without taking into account the single connection.

The aggregate request for the guaranteed and excess quotes is time varying, due to the bursty nature of the traffic; for example, some connections of a terminal can be silent for a certain amount of time. Therefore, the assignment to a terminal of a stationary guaranteed quote equal to the maximum aggregated guaranteed traffic and a static proportion of the excess leads to an incorrect distribution of the bandwidth.

When in a terminal some connections are silent while other ones are asking more traffic than their guaranteed quote, the latter, at base station level, can "steal" the guaranteed and excess bandwidth of the silent connections of their terminal, since the base station has visibility of the aggregates only. The effect is an improper distribution of the traffic among the terminals and, consequently, among the connections. A mechanism that allows a dynamic allocation of the granted bandwidth and partitioning of the excess to the terminals can solve the problem.

In order to further enhance the performance of the method and system according to the present invention, a new method of handling packet based traffic with guaranteed bandwidth requirements is hereby disclosed.

For a proper handling of a service category with guaranteed bandwidth, in the request for service the terminals have to communicate to the base station not only the aggregated amount of data in the queues, i.e. the queue status, related to the connections of that service category, but also an information on the aggregate guaranteed rate. Let $qa_{x,c}(t)$ and $wa_{x,c}(t)$ be the aggregate queue status and the aggregate guaranteed rate respectively for the service category c of terminal x.

The aggregate queue status is given by $$qa_{x,c}(t) = \sum_{i=1}^{nc_x} q_{x,c,i}(t),$$

with $nc_x$ the number of active connections and $q_{c,x,i}(t)$ the queue status of connection i related to the service category c in the terminal x.

The aggregate guaranteed rate is $$wa_{x,c}(t) = \sum_{i=1}^{nc_x} w_{x,c,i} \cdot \eta(q_{x,c,i}(t)),$$

with $\eta(.)$ the heaviside function and $w_{x,c,i}$ the guaranteed rate, usually a constant parameter, assigned to the connection i of the service category c in the terminal x. This means that $wa_{x,c}(t)$ is equal to the sum of the guaranteed rates of the connections that have at least one cell in the corresponding queue in the terminal.

The request for service that the terminal x sends to the base station consists of the couple $(qa_{x,c}(t), wa_{x,c}(t))$ for the service category c.

The scheduling function in the base station handles dynamically the allocation of the guaranteed bandwidth to the terminals according to the needs of the connections not silent in the terminal. In this way only the necessary bandwidth is allocated as granted while the rest can be distributed among all the connections as excess bandwidth.

The distribution of excess bandwidth can follow a commonly used scheduling scheme, for instance round robin for a fair distribution among all the connections, weighted round robin or weighted interleaved round robin for a distribution proportional to the guaranteed rate. In case a distribution of the excess in proportion to the guaranteed rate is adopted, a dynamic update of the weights, proportional to $wa_{x,c}(t)$ used to schedule the excess traffic among the terminals, has to be provided. To properly schedule the traffic it is necessary to separate the granted quote from the excess. The guaranteed portion must have higher priority than the excess traffic so that it passes first and then the remaining bandwidth is distributed among the terminals as excess.

The granted part works as follows. The request information is required to reach the base station periodically every T seconds. As a consequence $qa_{x,c}(t)$ and $wa_{x,c}(t)$ are stepwise functions at base station level. Since $wa_{x,c}(t)$ represents a rate, to determine the portion of the request $qa_{x,c}(t)$ that has to be served as guaranteed, it is introduced a timeframe, hereby identified as integration time (IT). The IT parameter represents the time window over which the instantaneous traffic is monitored and the computation of the guaranteed quote, in terms of cells, is determined per terminal. The concept is that, during an integration time, the permits requested by a terminal are served as guaranteed until the number of served cells reaches the amount that can be transferred as granted during the current IT, according to the aggregate rate communicated by the terminal. Requests exceeding the limit can be handled only as excess traffic. In this way a simple boundary between guaranteed and excess traffic can be defined on a terminal basis. The limit bounding the guaranteed quote refers to a timeframe given by IT, but is updated on each polling period T so as to allow a dynamic adjusting of the guaranteed quote to the actual needs of each terminal.

In more detail, the integration time IT is set to be a multiple of T: IT=k*T, with k an integer from 1 upwards. Integrating the aggregate rate over IT, the maximum number of guaranteed cells per IT at time m·T for terminal x is obtained:

$$Qa_{x,c}(m \cdot T) = \int_{IT} wa_{x,c}(m \cdot T) dt.$$

This integration is repeated every time a new couple of request parameters comes from the terminal, that is each T. The resulting function is stepwise. The computation of $Qa_{x,c}(m \cdot T)$, in the following represented as the sequence $Qa_{x,c}(m)$, every T seconds allows a dynamic adjustment of the granted quote for a terminal according to its real needs. The aggregate of connections of service category c related to a terminal x is allowed to take part in the scheduling for the granted quote until there are cells to be sent and the following relation between served cells $s_x(t)$ in IT for that terminal and $Qa_{x,c}(m)$ holds: $Qa_{x,c}(m) > s_x(t)$ for t ranging between $t_i$ and $t_i + IT$, where $t_i$ is the starting time of the integration. So, if, for example, the base station receives $Qa_{x,c}(m_1)$ and then $Qa_{x,c}(m_2)$ the following cases can happen:

$Qa_{x,c}(m_2) >= Qa_{x,c}(m_1)$, then the aggregate of connections will receive more guaranteed bandwidth until $Qa_{x,c}(m_2) > s_x(t)$;

$s_x(t) < Qa_{x,c}(m_2) < Qa_{x,c}(m_1)$, then the aggregate of connections will receive more guaranteed traffic up to $Qa_{x,c}(m_2)$, otherwise nothing, since the guaranteed quote has been already spent for that integration time. If this condition persists, the terminal x will receive a new guaranteed quote only at the beginning of the next integration time when $s_x(t)$ goes back to zero.

Figure 11:
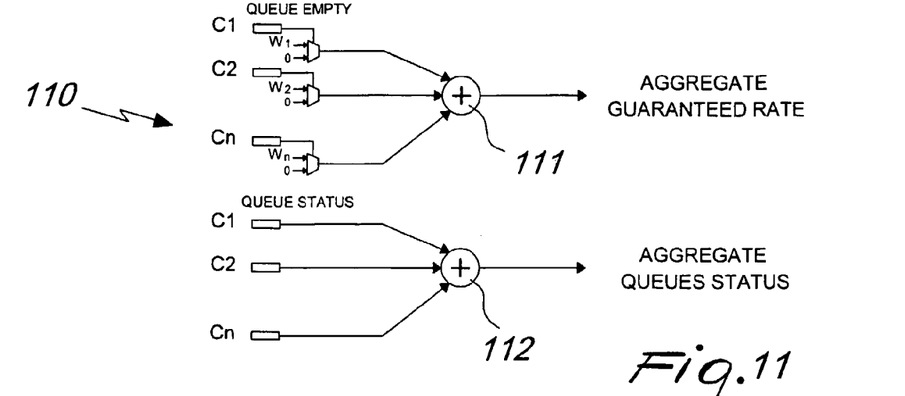
FIG. 11 is a block diagram showing a guaranteed and excess bandwidth requests gathering and aggregation according to a further aspect of the present invention.
Figure 12:
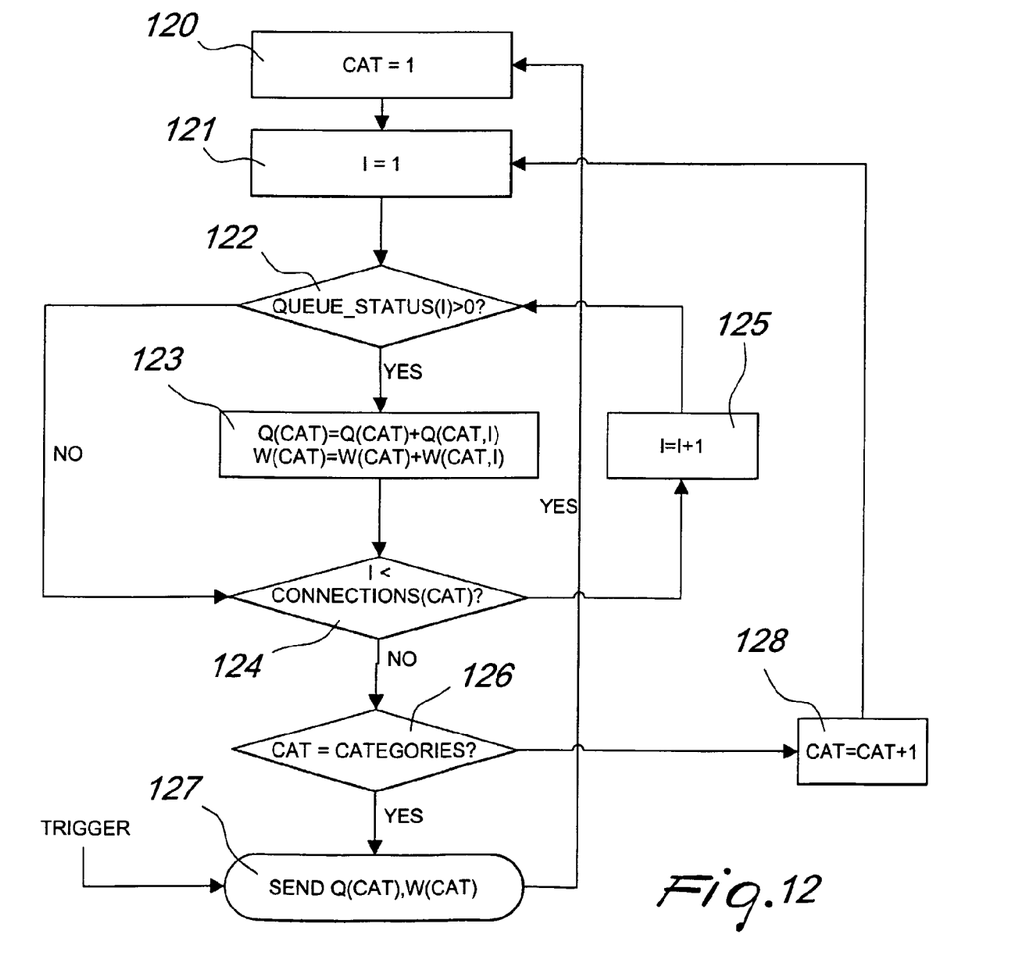
FIGS. 12 and 13 are flow diagrams showing guaranteed and excess bandwidth gathering on a slave element and scheduling on a master element.
Figure 13:
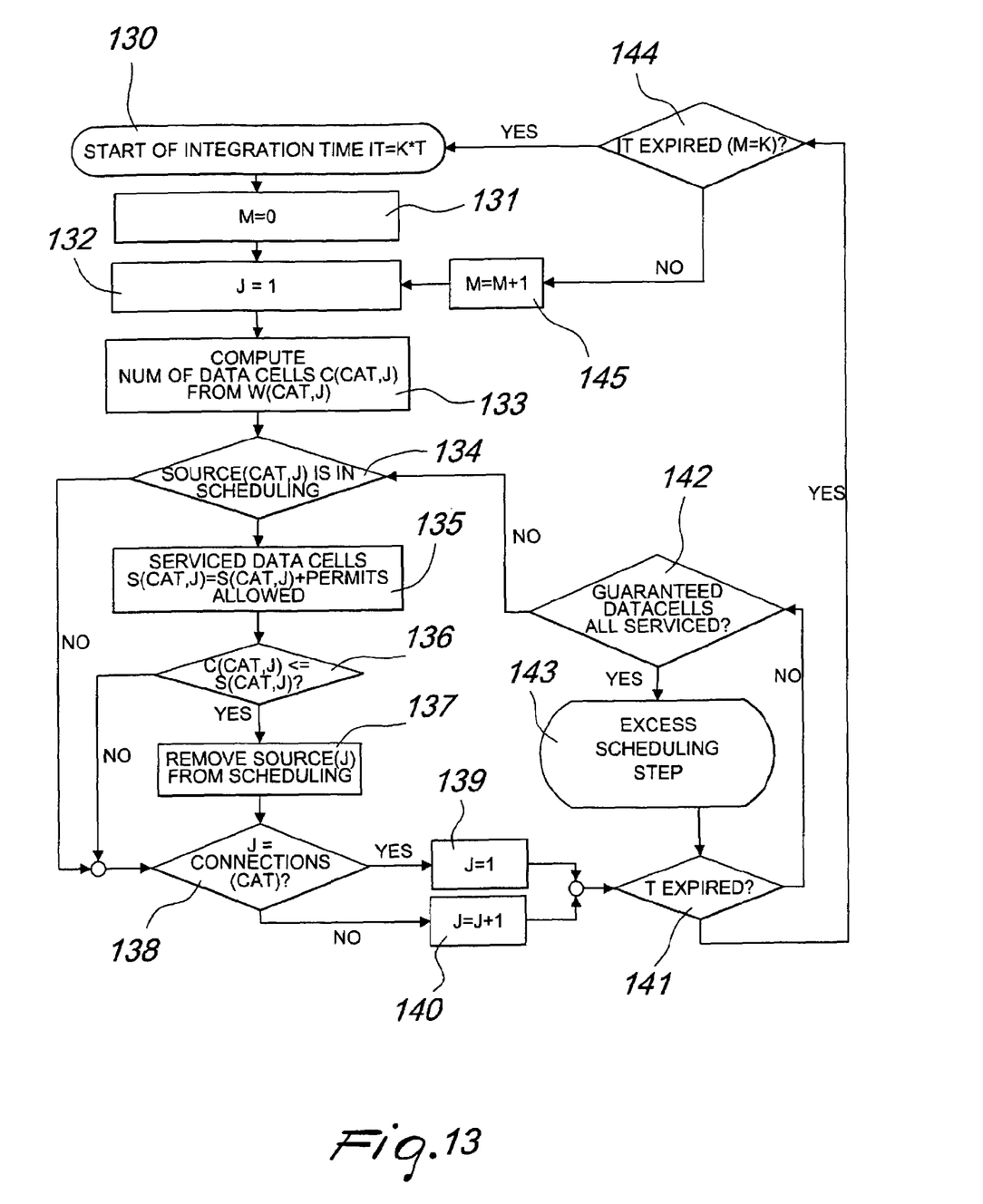

An illustrative implementation of the described improvement is shown in FIGS. 11 to 13. Element 110, which may either be a slave concentration element 30 or a terminal 20, is provided with aggregation means 111, 112 operating on a plurality of connections C1, C2, Cn.

Means 112 are in charge of aggregating the queue statuses of the connection, and to output an aggregate queue status. Typically, the aggregate queue status is given by the sum of each single queue status.

Means 111 are in charge of generating an aggregate guaranteed rate information.

The flow diagram of FIG. 12 schematically depicts the steps that are performed to this purpose by a slave element when multiple categories are involved in the process.

At step 120, a first category CAT is selected.

At step 121, a counter I is initialised and set to "1". Such counter cycles from the first connection in category CAT to the total amount of connections in category CAT.

At step 122 it is checked whether the queue status of connection I is empty or not. If the queue status is not empty, at step 123 the total amount of required bandwidth for the current category, Q(CAT), is increased by the amount of pending data cells in the I-th connection, Q(CAT,I). At the same time, the total amount of required guaranteed bandwidth for the current category, W(CAT), is increased by the amount of pending data cells which require guaranteed bandwidth in the I-th connection, W(CAT,I).

At step 124 (to which the system also arrives if at step 122 it is determined that the queue status is empty), it is checked whether more connections are available in the current category. If so, the operation of the system loops back to block 122, after having incremented I at step 125, until all connections have been checked.

At step 126 it is checked whether more categories are available. If so, the category index CAT is increased by one unit at step 128 going back, then, to step 122. If not, at step 127 a polling request is received at the slave element, which then forwards the aggregate information for each category to its master element and is then ready to resume the counting from the start at step 120.

The flow diagram of FIG. 13 schematically depicts the steps that are performed by a master element to serve guaranteed and excess bandwidth. For clarity reasons, the process is depicted with regard to a category CAT, but it is clearly iterated over all of the available categories in the element.

At step 130 the integration time IT, which is equal to the polling period T multiplied by an integer value K, is started.

At step 131 a variable M, which counts the polling periods within the integration time IT is initialised to "0".

At step 132, a variable J, which ranges from 1 to the number of connections to be served, is set to "1".

At step 133, starting from the information concerning the amount of guaranteed bandwidth requested by the J-th connection or source of traffic, the actual number of requested data cells C(CAT,J) is computed.

At step 134 the scheduler checks whether the J-th source of traffic in the current category, SOURCE(CAT, J), is in the scheduling list. If so, at step 135 the amount of serviced data cells S(CAT, J), concerning the data cells to be serviced as guaranteed for SOURCE(CAT,J) is increased by a number of permits allowed by the scheduler.

At step 136, it is checked whether the amount of serviced data cells S(CAT,J) has reached the amount of requested cells C(CAT,J). If so, the J-th source of traffic SOURCE(J) is removed from scheduling at step 137.

At step 138, it is checked whether the list of sources of traffic has been fully scanned.

If so, at step 139, the index J is reset to point to the first source of traffic, otherwise it is incremented to point to the next source of traffic in the list at step 140.

At step 141, it is checked whether the polling period T has expired.

If the polling period T has not expired, the scheduler verifies at step 142 that all of guaranteed data cells requested by the pending sources of traffic have been serviced.

Should the outcome of the test be positive, the scheduler starts the excess scheduling activity, summarised by block 143, otherwise the process is resumed at step 134.

When the polling period expires, the scheduler checks at step 144 whether the iteration time IT is also over and, if so, a new integration time is started. Otherwise, the counter M is incremented by one unit at step 145 and the same operations described with regard to steps 132 to 141 are repeated all over again.

It has thus been shown that the present invention fulfils the proposed aim and objects.

In summary, it has been shown that the new MAC according to the invention uses a distributed scheduling in a hierarchical point-to-multipoint access network where, at each level of the hierarchy, the concentration element (the master) handles the traffic coming from each terminal (the slave) as aggregates (one for each traffic class) without awareness of the elementary flows at lower level.

The master allocates an amount of bandwidth to its slave elements that, then, distribute it among their slaves. Therefore, the scheduling decision is distributed in time and spatially. This solution reduces the product signalling bandwidth-latency, which becomes proportional to the number of slave elements in one level of the hierarchy, instead of the number of traffic sources.

The new proposed MAC is advantageously polling based. The request information from the terminals is partitioned all over the frame, instead of concentrating it in specific signalling slots.

The size of the field needed to code the requests does not depend on the polling period anymore, but it is related to the RTT and the number of the traffic classes to be served. In this way, the dimensioning of the request field is always proper, saving bandwidth. In fact, while the polling period can vary according to the real time requirements, RTT and the number of requesting groups are constant.

Advantageously, a distributed scheduling is also provided in order to handle the traffic with a guaranteed quote. A function is therefore introduced, which integrates in the master element the requests of the granted bandwidth over a certain timeframe (integration time). This allows a dynamic adjustment of the guaranteed quote for each slave element according to its real instantaneous needs.

Moreover, the usage of an integration time allows dividing the part of aggregate traffic that has to be necessarily served from the optional quotes. Therefore, the scheduler in each concentration element distributes the bandwidth allocated to it between guaranteed and excess traffic on an elementary flow basis.

Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

The invention claimed is:

1. A polling based method of scheduling upstream data for frame based communication between a plurality of terminals and a master controller, the method comprising:

dividing a communication from each one of said terminals to the master controller into upstream frames;

providing a plurality of concentration elements for local scheduling of upstream data and partitioning the plurality of concentration elements and the plurality of terminals over a plurality of cells;

distributing said plurality of cells on a multiple hierarchical level star topology, each cell belonging to a hierarchical level N, where N is comprised between a top level, corresponding to a single cell to which the master controller is assigned, and a bottom level;

in each cell at level N, selecting one concentration element to be the master element for the cell and selecting the remaining concentration elements and terminals in said cell to be slave elements of the master element for the cell;

each master element in a cell at level N being in turn a slave of the master element in one of the cells at level N+1, the master element at the top level being the master controller;

defining flow service categories;

at each master element at level N, collecting uplink aggregate requests and flows originating from the slave elements thereof and, for each service category, aggregating flows into one aggregated flow generating new uplink requests for each flow, which are input to the master element at level N+1 to which the master element at level N is slave;

at each master element, allocating bandwidth to each connected slave according to said new uplink aggregate requests and to the available bandwidth;

at each slave element at level N, aggregating flows according to said flows categories and, at each polling period, sending aggregate bandwidth requests to the corresponding master element at level N, said requests comprising, for each category, aggregate queue status of the active connections and aggregate guaranteed rate equal to the sum of the guaranteed rates of the connections that have at least one cell in the corresponding queue in the slave element; and at each master element and at each polling time period, integrating the aggregate guaranteed rate over a time window of length IT, where IT is an integer multiple of the polling time period, so as to dynamically adjust the guaranteed quote for each slave element.

2. The method of claim 1, further comprising, at each master element, recalculating requests for each aggregate flow at each polling period or multiple thereof.

3. The method of claim 1, further comprising reserving a first portion of the upstream frame for the storing of bandwidth request information, the size of said first portion of the frame being sufficient to address all the slots in the frame.

4. The method of claim 1, further comprising:
reserving a first portion of the upstream frame for the storing of bandwidth request information, the size of the first portion of the upstream frame being sufficient to address RTT +($N_{RG}$–1) slots in the upstream frame, wherein RTT is the Round Trip Time and $N_{RG}$ is the number of different request groups in a terminal; and
piggybacking the remaining request information on traffic slots in the upstream frame.

5. The method of claim 1, wherein the bandwidth request information comprises guaranteed bandwidth requirements and excess bandwidth requirements.

6. A polling based distributed scheduler for frame based communication between a plurality of terminals and a master controller, comprising:
a plurality of concentration elements for local scheduling of upstream data; and
upstream frames into which a communication between each one of said terminals and said master controller is divided,
wherein:
the plurality of concentration elements and the plurality of terminals are partitioned over a plurality of cells distributed on a multiple hierarchical level star topology, each cell belonging to a hierarchical level N, where N is comprised between a top level, corresponding to a single cell to which the master controller is assigned, and a bottom level;
at each cell at level N, one concentration element is the master element for the cell and the remaining concentration elements and terminals in said cell are slave elements of the master element for the cell;
each master element in a cell at level N is in turn a slave of the master element in one of the cells at level N +1, the master element at the top level being the master controller;
each master element at level N comprises:
means for collecting uplink aggregate requests and flows originating from the slave elements thereof;
means for generating, according to flow service categories, an aggregate flow and aggregate uplink requests, which are input to the master element at level N+1 to which the master element at level N is slave; and
means for allocating bandwidth to each connected slave according to said aggregate requests and to the available bandwidth;
each slave element at level N comprises aggregating flows means which aggregate flows according to said flows categories and, at each polling period, send aggregate bandwidth requests to the corresponding master element at level N, said requests comprising, for each category, aggregate queue status of the active connections and aggregate guaranteed rate equal to the sum of the guaranteed rates of the connections that have at least one cell in the corresponding queue in the slave element; and
each master element comprises means for integrating at each polling time period the aggregate guaranteed rate over a time window of length IT, where IT is an integer multiple of the polling time period, so as to dynamically adjust the guaranteed quote for each slave element.

7. The scheduler of claim 6, comprising polling means that, at each master element, are set so as to recalculate aggregate requests at each polling period or multiple thereof.

8. The scheduler of claim 6, wherein a first portion of the upstream frame stores bandwidth request information, the size of said first portion of the frame being sufficient to address all the slots in the frame.

9. The scheduler of claim 6, wherein:
a first portion of the upstream frame is reserved for the storing of bandwidth request information, the size of the first portion of the upstream frame being sufficient to address RTT +($N_{RG}$–1) slots in the upstream frame, wherein RTT is the Round Trip Time and $N_{RG}$ is the number of different request groups in a terminal; and
the remaining request information on traffic slots is piggybacked in the upstream frame.

10. The scheduler of claim 6, wherein the bandwidth request information comprises guaranteed bandwidth requirements and excess bandwidth requirements.

* * * * *

UNITED STATES PATENT AND TRADEMARK OFFICE
CERTIFICATE OF CORRECTION

| | |
|---|---|
| PATENT NO. | : 7,639,651 B2 |
| APPLICATION NO. | : 10/596403 |
| DATED | : December 29, 2009 |
| INVENTOR(S) | : Di Lodovico et al. |

Page 1 of 1

It is certified that error appears in the above-identified patent and that said Letters Patent is hereby corrected as shown below:

In Column 11, Lines 10-11, delete " $BD_{IP}=(req\_slots*SL*8+(PP-req\_slots)*\lceil \log_2(RTT+N_{RG}-1\rceil)*100/(PP*SL*8).$ "

and insert -- $BD_{IP}=(req\_slots*SL*8+(PP-req\_slots)*\lceil \log_2(RTT+N_{RG}-1\rceil)*100/(PP*SL*8).$ --, therefor.

In Column 12, Line 55, delete " $q_{c,x,i}(t)$ " and insert -- $q_{x,c,i}(t)$ --, therefor.

Signed and Sealed this
Fourth Day of January, 2011

David J. Kappos
*Director of the United States Patent and Trademark Office*